(12) United States Patent
Kabune et al.

(10) Patent No.: US 7,321,994 B2
(45) Date of Patent: Jan. 22, 2008

(54) ELECTRONIC CONTROL UNIT

(75) Inventors: Hideki Kabune, Chiryu (JP); Hiromi Maehata, Chiryu (JP)

(73) Assignees: DENSO CORPORATION, Kariya (JP); ADVICS CO., LTD., Aichi-pref. (JP)

( * ) Notice: Subject to any disclaimer, the term of this patent is extended or adjusted under 35 U.S.C. 154(b) by 283 days.

(21) Appl. No.: 10/771,469

(22) Filed: Feb. 5, 2004

(65) Prior Publication Data

US 2004/0158779 A1 Aug. 12, 2004

(30) Foreign Application Priority Data

Feb. 6, 2003 (JP) ............... 2003-029884

(51) Int. Cl.
*G06F 11/00* (2006.01)

(52) U.S. Cl. ..................... 714/55

(58) Field of Classification Search .......... 714/55, 714/25

See application file for complete search history.

(56) References Cited

U.S. PATENT DOCUMENTS

| | | | | |
|---|---|---|---|---|
| 3,857,612 A | * | 12/1974 | Bynum ............ | 303/185 |
| 4,480,217 A | * | 10/1984 | Robbins et al. ...... | 318/618 |
| 5,113,504 A | * | 5/1992 | Matsuda ............ | 714/23 |
| 5,549,368 A | | 8/1996 | Yasuzumi | |
| 5,715,726 A | * | 2/1998 | Matsumoto et al. ...... | 73/118.1 |
| 5,755,291 A | * | 5/1998 | Orbach et al. ............ | 172/2 |
| 2003/0043748 A1 | * | 3/2003 | Gabara ............ | 370/241 |

FOREIGN PATENT DOCUMENTS

| | | |
|---|---|---|
| DE | 199 53 865 A1 | 5/2000 |
| JP | A-8-258694 | 10/1996 |
| JP | A-9-60568 | 3/1997 |
| JP | A-H10-59160 | 3/1998 |
| JP | A-H11-51948 | 2/1999 |
| JP | A-2000-142363 | 5/2000 |

* cited by examiner

*Primary Examiner*—Robert Beausoliel
*Assistant Examiner*—Amine Riad
(74) *Attorney, Agent, or Firm*—Posz Law Group, PLC

(57) ABSTRACT

An electronic control unit includes a microcomputer and an input interface circuit. The microcomputer has square wave input ports, a reference square wave input port, a serial communication port, and an output port. Square wave signals are inputted from sensors to four channels of the input interface circuit. A channel selector included in the input interface circuit the selects square wave signals in orderly sequence for capturing. The microcomputer performs a comparison between a time at which the square wave is captured and a time at which the selected square wave signal is captured for diagnosing operation of an input capturing function.

15 Claims, 3 Drawing Sheets

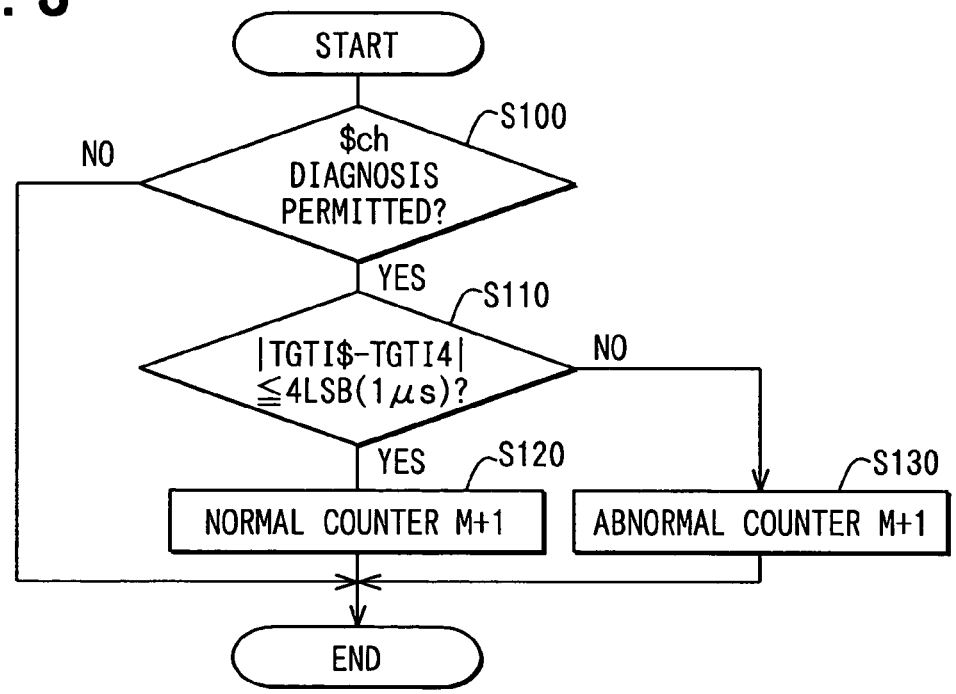
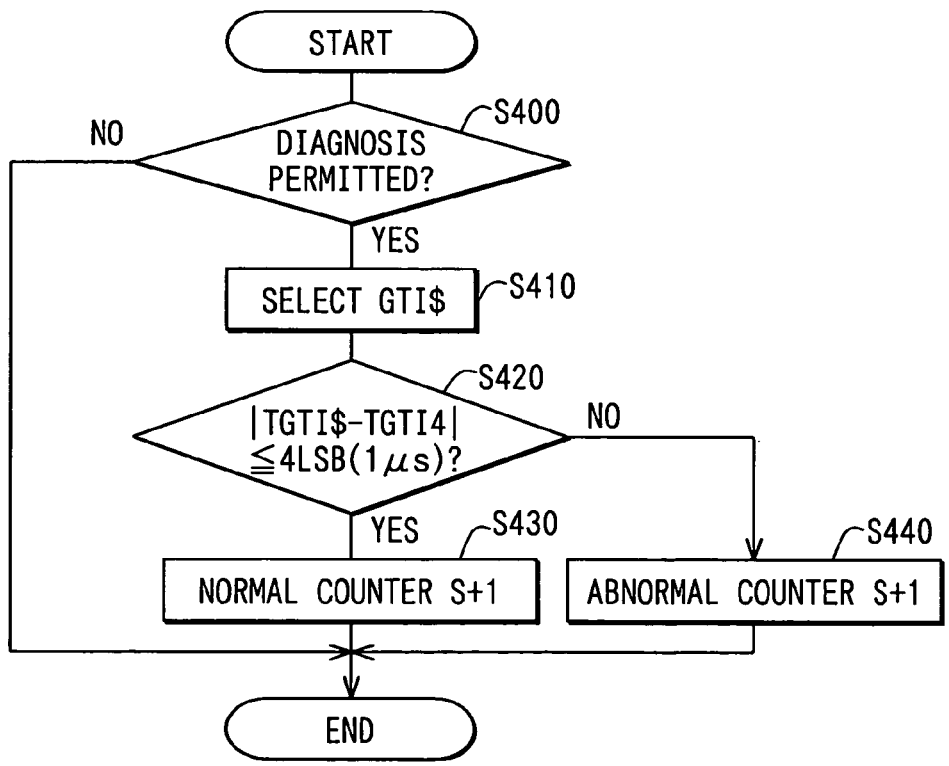

ELECTRONIC CONTROL UNIT

CROSS REFERENCE TO RELATED APPLICATION

This application is based on and incorporates herein by reference Japanese Patent Application No. 2003-29884 filed on Feb. 6, 2003.

FIELD OF THE INVENTION

The present invention relates to an electronic control unit having a microcomputer for controlling an actuator.

BACKGROUND OF THE INVENTION

A vehicle control device proposed in JP-11-51948 includes a CPU for calculating the vehicle wheel speed. The control device has an input capture function for capturing the time of an internal timer at which an edge is formed in a waveform of a vehicle wheel speed signal. The wheel speed signal is inputted from a vehicle wheel speed sensor via an input interface circuit. The CPU calculates a wheel speed based on the captured time.

An accuracy of the wheel speed calculation is critical for an antilock brake system, and the operation of the input capture function is required to be continuously monitored. However, the input capture function is monitored only when the vehicle is determined as parked, and therefore not monitored when the vehicle is running.

The input capture function of the microcomputer for control may be monitored by another microcomputer. In this case, the other microcomputer performs the same calculation and comparison between both results of the calculations. Then, it determines whether the operation of the input capture function of the microcomputer for control is normal. However, the device becomes expensive with this configuration, which has impact on competitiveness of the device in the market.

SUMMARY OF THE INVENTION

The present invention therefore has an objective to provide an inexpensive electronic control unit that continuously monitors an input capture function. An electronic control unit (ECU) of the present invention includes a microcomputer, a first internal timer, and a second internal timer. The microcomputer has a first input capture function and a second input capture function. The first input capture function is provided for capturing the time of the first timer at which an edge of a square wave input signal is detected. The second capture function is provided for capturing the time of the second timer at which the edge of the square wave input signal is detected. The microcomputer performs calculation based on the time of the first timer for controlling an actuator.

The microcomputer diagnoses the input capture function based on a comparison between the time of the first timer and the time of the second timer for. If the operation of the input capture function is normal, the time of the first timer and the time of the second timer are approximately equal. Therefore, the ECU can determine whether the operation of the input capture function is normal based on the comparison, namely, the ECU can continuously monitor its own input capture function. Moreover, an additional microcomputer is not required for the monitoring, and therefore an inexpensive ECU can be provided.

BRIEF DESCRIPTION OF THE DRAWINGS

The above and other objectives, features and advantages of the present invention will become more apparent from the following detailed description made with reference to the accompanying drawings. In the drawings:

FIG. 3 is a flowchart showing an interrupt process of a microcomputer according to the embodiment; and FIG. 4 is a flowchart showing an interrupt process of a microcomputer according to the embodiment.

DETAILED DESCRIPTION OF THE PREFERRED EMBODIMENT

The preferred embodiment of the present invention will be explained with reference to the accompanying drawings.

Figure 1:
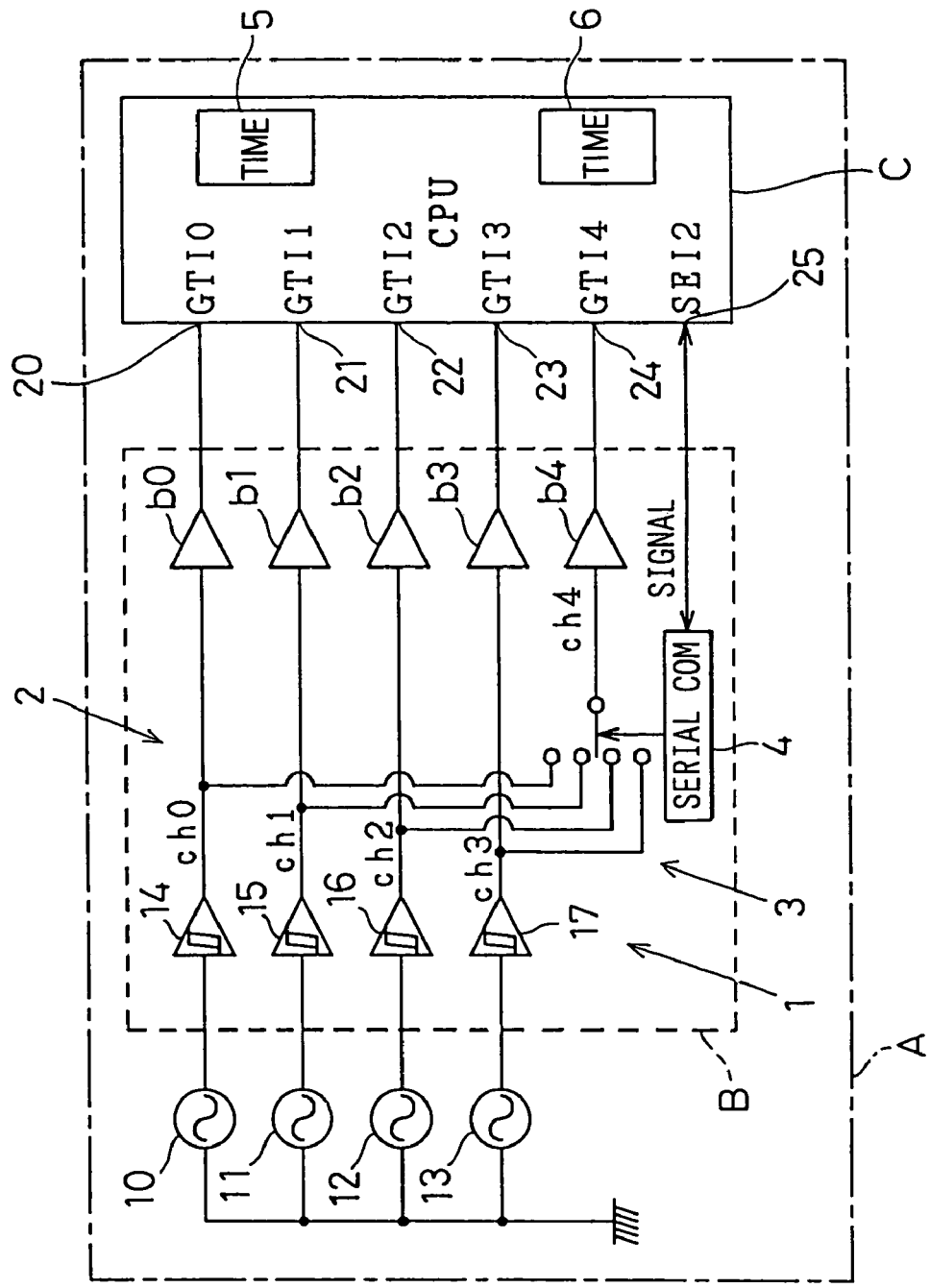
FIG. 1 is a block diagram of an electronic control unit according to an embodiment of the present invention.

Referring to FIG. 1, an electronic control unit (ECU) A includes an input interface circuit B and a microcomputer C. The interface circuit B is constructed of a square wave converter section 1, a signal input buffer section 2, a channel selector (switching means) 3, and a serial communication section 4.

The converter section 1 converts four channels (ch0-ch3) of sine wave signals outputted from vehicle wheel speed sensors 10-13 into square wave signals via comparators 14-17. The buffer section 2 inputs variation in the square wave signals with time in buffer b0-b3. The channel selector 3 selects one of the square wave signals, and inputs it in the buffer b4 (ch4).

The microcomputer C has input ports 20-23 (GTI0-GTI3), a reference signal input port 24 (GTI4) and a communication port 25 (SEI2), and an output port (not shown). The input ports 20-23 and the reference signal input port 24 are provided for inputting the four channels of the square wave signals and one channel of a reference square wave signal, respectively. The communication port 25 is provided for serial communication with the serial communication section 4.

The microcomputer C has a first input capture function for capturing the time of a first internal timer 5 at which an edge of each square wave signal is detected. The microcomputer C performs calculation based on each captured time for producing an oil pressure control signal, and outputs the control signal via the output port.

The microcomputer C has a second input capture function for capturing the time of a second internal timer 6 at which an edge of a square wave signal selected by the channel selector 3 is detected. The first timer 5 and the second timer are independently configured with different timers. The first timer 5 and the second timer are used for capturing a time for calculation and for a reference time for a comparison.

The serial communication section 4 performs serial communication with the communication port 25 using channel (ch) switching signals. In the serial communication, a ch selecting request is sent and a currently selected ch is received.

Figure 2:
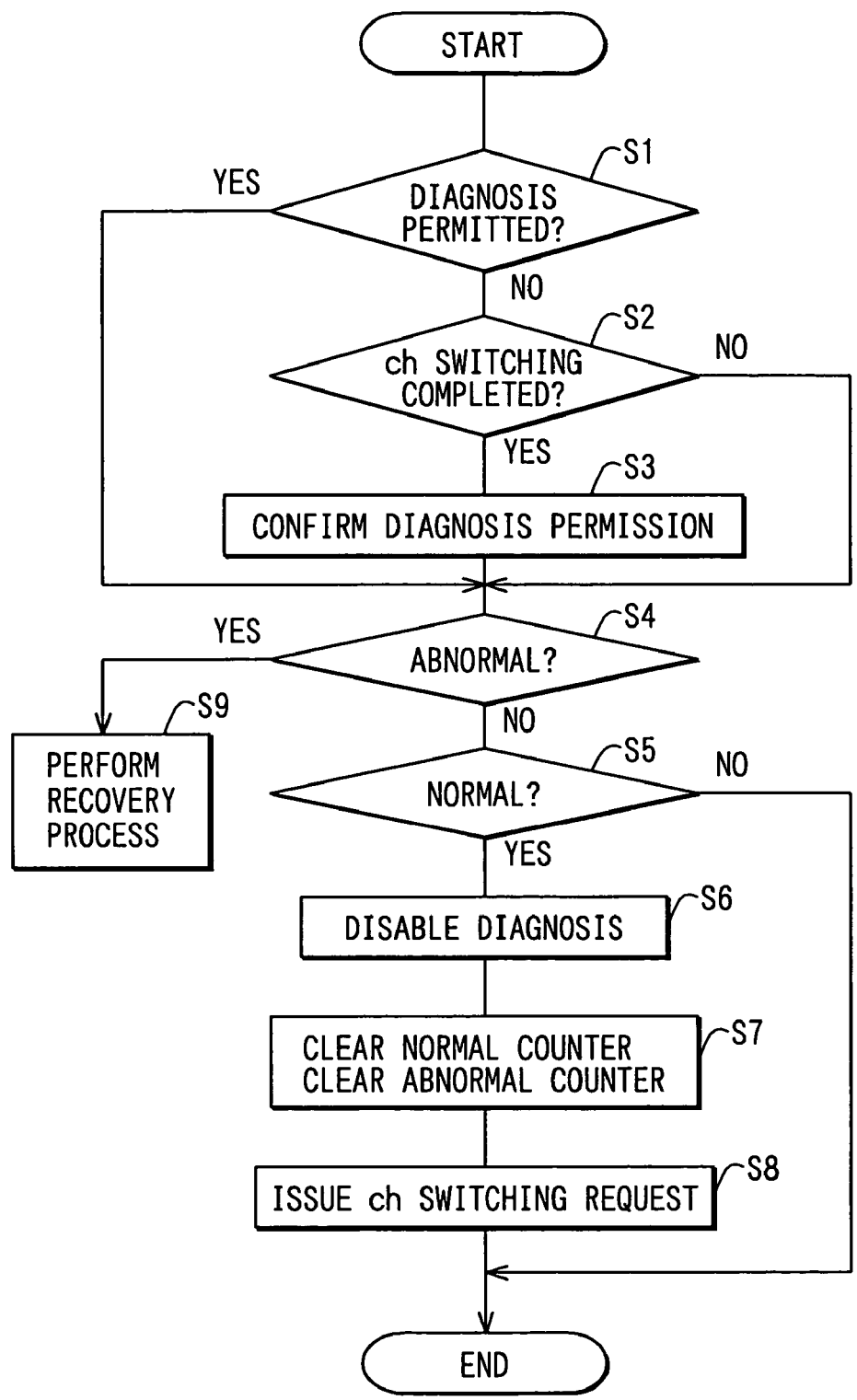
FIG. 2 is a flowchart showing a base process of a microcomputer included in the electronic control unit according to the embodiment.

The microcomputer C performs a 6 ms base process for diagnosing the input capture function of the ECU A as shown in FIG. 2. It is determined whether it is in a diagnosis permitted period (S1). If it is so (YES), the process proceeds to step S4. If it is not so (NO), it is determined whether a switching to a channel for a diagnosis is completed (S2). If it is completed (YES), permission for the diagnosis is confirmed and comparison steps in the GIT$N interrupt process ($=0, 1, 2, 3) shown in FIG. 3 and in the GTI4 interrupt process shown in FIG. 4 are performed (S3). If it is not completed (NO), the process proceeds step S4.

It is determined whether it is in a diagnosis permitted period for the channel $ch (S100). If it is so (YES), a comparison is performed between a period of |TGTI$-TGTI4| and a period of 4 LSB (1 μs) (S110). If it is not so (NO), a regular interrupt process is performed and the interrupt is completed.

If the period of |TGTI$-TGTI4| is equal to or shorter than the period of 4 LSB (|TGTI$-TGTI4|≦4 LSB), it is determined that the operation of the in put capture function is normal. Then, a normal counter M is incremented by 1 (with 0×FF guard), namely, the normal counter M=the normal counter M+1 (S120). If the period of |TGTI$-TGTI4| is longer than the period of 4 LSB (|TGTI$-TGTI4|>4 LSB), it is determined that the operation of the input capture function is abnormal. Then, an abnormal counter M is incremented by 1 (with 0×FF guard), namely, the abnormal counter M=the abnormal counter M+1 (S130).

In the GTI4 interrupt process, it is determined whether it is in a diagnosis permitted period (S400). If it is so (YES), the port GTI$ is selected (S410). If it is not so (NO), the interrupt process is terminated.

A comparison is performed between a period of |TGTI$-TGTI4| and a period of 4 LSB (1 μs) (S420). If the period of |TGTI$-TGTI4| is equal to or shorter than the period of 4 LSB (|TGTI$-TGTI4|≦4 LSB), it is determined that the operation of the capture function is normal. Then, a normal counter S is incremented by 1 (with 0×FF guard), namely, the normal counter S=the normal counter S+1 (S430). If the period of |TGTI$-TGTI4| is longer than the period of 4 LSB (|TGTI$-TGTI4|>4 LSB), it is determined that the operation of the capture function is abnormal. Then, an abnormal counter S is incremented by 1 (with 0×FF guard), namely, the abnormal counter S=the abnormal counter S+1 (S440).

In step S4 of the base process, it is determined whether the operation of the capture function is normal. If the following three conditions are all satisfied, it is determined that the operation of the capture function is abnormal (YES) and an abnormal operation recovery process is performed (S9):

abnormal counter M>3;

abnormal counter S>3; and

|abnormal counter M+normal counter M−abnormal counter M−normal counter S|>3.

If the three conditions are not satisfied (NO), it is determined whether the following conditions are satisfied:

normal counter M>1; and normal counter S>1.

If the conditions are satisfied, it is determined that the operation of the capture function is normal (YES). If the conditions are not satisfied, it is determined that the operation of the capture function is not normal (NO) and the process is terminated.

If the capture function operation is determined as normal, the diagnosis is disabled (S6). The normal counters M, S and the abnormal counters M, S are cleared (S7). A diagnosing ch switching request is issued for switching to the next channel (S8).

In the recovery process (S9), the actuator control performed by the microcomputer C is disabled after the actuator is saved in a safe position. Then, the abnormal operation of the capture function is reported via a lamp or a buzzer.

In the ECU A, the microcomputer C diagnoses the operation of the capture function based on the absolute value of the result of the subtraction between the time TGTI$ and the reference time TGTI4. The ECU A has the channel selector 3 that selects the square wave signal in orderly sequence for capturing among the square wave signals of ch0-ch3. Thus, the microcomputer can self-diagnose the four-channel capture function for capturing four kinds of sensor signals outputted from the wheel sensors 10-13 by time sharing. Moreover, an additional microcomputer is not required for the diagnosis, which makes the ECU A inexpensive.

The channel selector 3 is provided outside the microcomputer C. As a result, interference between input capture signal lines for inputting multiple square wave signals to the input ports 20-24 can be detected.

The diagnosis is disabled during the switching of the channel selector 3. Thus, erroneous edge detection caused by the switching is reduced. The diagnosis may be disabled during a predetermined period after the switching. The diagnosis may be disabled by excluding the captured time from using for the comparison if the time is captured at the time when the edge is detected for the first time since the switching.

The ECU A includes two independent timers: the first internal timer 5 for capturing the time for calculation and the second internal timer 6 for capturing the time for comparison. Therefore, the input capture function and the internal timer function can be diagnosed. The first internal timer 5 and the second internal timer 6 can be configured in one timer.

When the capture function operation is determined as abnormal, the actuator control by the microcomputer C is disabled after the actuator is saved in the safety position. Then, the abnormal operation is reported by a lamp or a buzzer. Thus, the safety operation is ensured and a user is notified of the abnormal operation.

The present invention should not be limited to the embodiment previously discussed and shown in the figures, but may be implemented in various ways without departing from the spirit of the invention. For example, the ECU A may perform calculation based on the captured time of the internal timer and output an oil pressure control signal produced from the calculation result via the output port.

The microcomputer C may have a capture function for capturing the time at which an edge of a square wave signal selected by the channel selector 3. A calculation result based on the first time captured by the first capture function is compared with a calculation result based on the second time captured by the second capture function.

The channel selector 3 can be integrated in the microcomputer C. The edge detection of the square wave signal can be performed using either one of a leading edge and a trailing edge.

What is claimed is:

1. An electronic control unit comprising:
   a microcomputer for controlling an actuator; and
   a first internal timer and a second internal timer, wherein
   the microcomputer includes a first input capture function for capturing a time of the first internal timer at which an edge of a square wave input signal is detected,
   the microcomputer performs calculation for the control of the actuator based on the time of the first internal timer, the microcomputer further includes a second input capture function for capturing a time of the second internal timer at which the edge of the square wave input signal is detected, and the microcomputer diagnoses at least one of the first and the second capturing functions by performing comparison between the time of the first internal timer and the time of the second internal timer.

2. The electronic control unit according to claim 1, wherein the first internal timer and the second internal timer are configured in one timer.

3. The electronic control unit according to claim 1, wherein the first internal timer and the second internal timer are independently configured.

4. The electronic control unit according to claim 1, wherein:
   the control of the actuator is disabled when one of the input capture function is determined as abnormal;
   the actuator is saved in a safe position; and
   the abnormal input capture function is reported.

5. An electronic control unit comprising:
   a microcomputer for controlling an actuator;
   a first internal timer and a second internal timer; and
   a switching means, wherein
   the microcomputer includes a first input capture function for capturing a time of the first internal timer at which an edge of each of square wave input signals is detected,
   the microcomputer performs calculation for the control of the actuator based on the time of the first internal timer,
   the switching means selects the square wave input signals in orderly sequence for capturing,
   the microcomputer further includes a second input capture function for capturing a time of the second internal timer at which the edge of the selected square wave input signal is detected, and
   the microcomputer diagnoses at least one of the first and the second capturing functions by performing comparison between the time of the first internal timer and the time of the second internal timer.

6. The electronic control unit according to claim 5, wherein the switching means is provided outside the microcomputer.

7. The electronic control unit according to claim 5, wherein the microcomputer disables the comparison during a predetermined period after the switching means has switched.

8. The electronic control unit according to claim 5, wherein the microcomputer excludes the time of the second internal timer from using for the comparison if the time is captured at a time when an edge of the square wave input signal is detected at least for the first time since the switching means has switched.

9. The electronic control unit according to claim 5, wherein the first internal timer and the second internal timer are configured in one timer.

10. The electronic control unit according to claim 5, wherein the first internal timer and the second internal timer are independently configured.

11. The electronic control unit according to claim 5, wherein:
    the control of the actuator is disabled when one of the input capture function is determined as abnormal;
    the actuator is saved in a safe position; and
    the abnormal input capture function is reported.

12. An electronic control unit comprising:
    a microcomputer for controlling an actuator; and
    a first internal timer and a second internal timer, wherein
    the microcomputer includes a first input capture function for capturing a time of the first internal timer at which an edge of a square wave input signal is detected,
    the microcomputer performs calculation for the control of the actuator based on the time of the first internal timer,
    the microcomputer further includes a second input capture function for capturing a time of the second internal timer at which the edge of the square wave input signal is detected, and
    the microcomputer diagnoses at least one of the first and the second capturing functions by performing comparison between a result of a calculation performed based on the time of the first internal timer and a result of a calculation performed based on the time of the second internal timer.

13. The electronic control unit according to claim 12, wherein the first internal timer and the second internal timer are configured in one timer.

14. The electronic control unit according to claim 12, wherein the first internal timer and the second internal timer are independently configured.

15. The electronic control unit according to claim 12, wherein:
    the control of the actuator is disabled when one of the input capture function is determined as abnormal;
    the actuator is saved in a safe position; and
    the abnormal input capture function is reported.

* * * * *